United States Patent
Sathaye et al.

(10) Patent No.: US 11,740,878 B1
(45) Date of Patent: Aug. 29, 2023

(54) CREATING CLI PACKAGES AND API PLAYBOOKS FROM CODIFIED GRAPHICAL USER EXPERIENCE DESIGNS

(71) Applicant: Dell Products, L.P., Hopkinton, MA (US)

(72) Inventors: Sumedh Sathaye, Austin, TX (US); Patrick East, Arvada, CO (US); Reut Kovetz, Tel Aviv (IL); Jennifer Minarik, Zionsville, IN (US); Kelly Lisai, Austin, TX (US); Arthur Lent, Newton, MA (US); Nicole Reineke, Northborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 42 days.

(21) Appl. No.: 17/704,178

(22) Filed: Mar. 25, 2022

(51) Int. Cl.
  *G06F 8/36* (2018.01)
(52) U.S. Cl.
  CPC ................... *G06F 8/36* (2013.01)
(58) Field of Classification Search
  None
  See application file for complete search history.

(56) References Cited

U.S. PATENT DOCUMENTS

| | | | |
|---|---|---|---|
| 7,231,631 B1* | 6/2007 | Branch Freeman | G06F 9/451 717/109 |
| 11,645,190 B1* | 5/2023 | Sathaye | G06F 11/3688 717/126 |
| 2016/0239274 A1* | 8/2016 | Strachota | G06F 8/30 |
| 2020/0233924 A1* | 7/2020 | George | G06F 40/186 |
| 2022/0308843 A1* | 9/2022 | Tanpure | G06F 8/38 |

OTHER PUBLICATIONS

Surdu, "Designing a Framwork for Creating CLIs", 2018, IEEE (Year: 2018).*

* cited by examiner

*Primary Examiner* — Hossain M Morshed
(74) *Attorney, Agent, or Firm* — Anderson Gorecki LLP

(57) ABSTRACT

Codified graphical user experience design includes finite state machine (FSM) metadata, logic describing the graphical aspects of the user experience design, and logic describing states of the user experience design and transitions between states. A GUI to API/CLI translator uses the codified graphical user experience design to automatically create corresponding CLI packages and API playbooks. The translator walks the FSM. For each visited state, a state based functional intermediate code package is created including the one or more API call basic blocks associated with API calls to be implemented at that state, and parameter definitions for each API call at that state. For each state transition, conditional intermediate code is created and attached to the API call basic blocks. The state based functional intermediate code packages with attached conditional intermediate code are used to create a CLI package or an API playbook based on the codified graphical user experience design.

18 Claims, 9 Drawing Sheets

Example Experience Definition

Experience specification interpreter

State Transition Processor Logic

US 11,740,878 B1

CREATING CLI PACKAGES AND API PLAYBOOKS FROM CODIFIED GRAPHICAL USER EXPERIENCE DESIGNS

FIELD

This disclosure relates to computing systems and related devices and methods, and, more particularly, to a method and apparatus for creating Command Line Interface (CLI) packages and Application Programming Interface (API) playbooks from codified graphical user experience designs.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method and apparatus for automating creation of Command Line Interface (CLI) packages and Application Programming Interface (API) playbooks from a codified graphical user experience design is provided.

A codified graphical user experience design includes finite state machine (FSM) metadata, logic describing the graphical aspects of the user experience design, and logic describing states of the user experience design and transitions between states. A GUI to API/CLI translator uses the codified graphical user experience design to automatically create corresponding CLI packages and API playbooks. The translator walks the FSM. For each visited state, a state based functional intermediate code package is created including the one or more API call basic blocks associated with API calls to be implemented at that state, and parameter definitions for each API call at that state. For each state transition, conditional intermediate code is created and attached to the API call basic blocks. The state based functional intermediate code packages with attached conditional intermediate code are used to create a CLI package or an API playbook based on the codified graphical user experience design.

DETAILED DESCRIPTION

Figure 1:
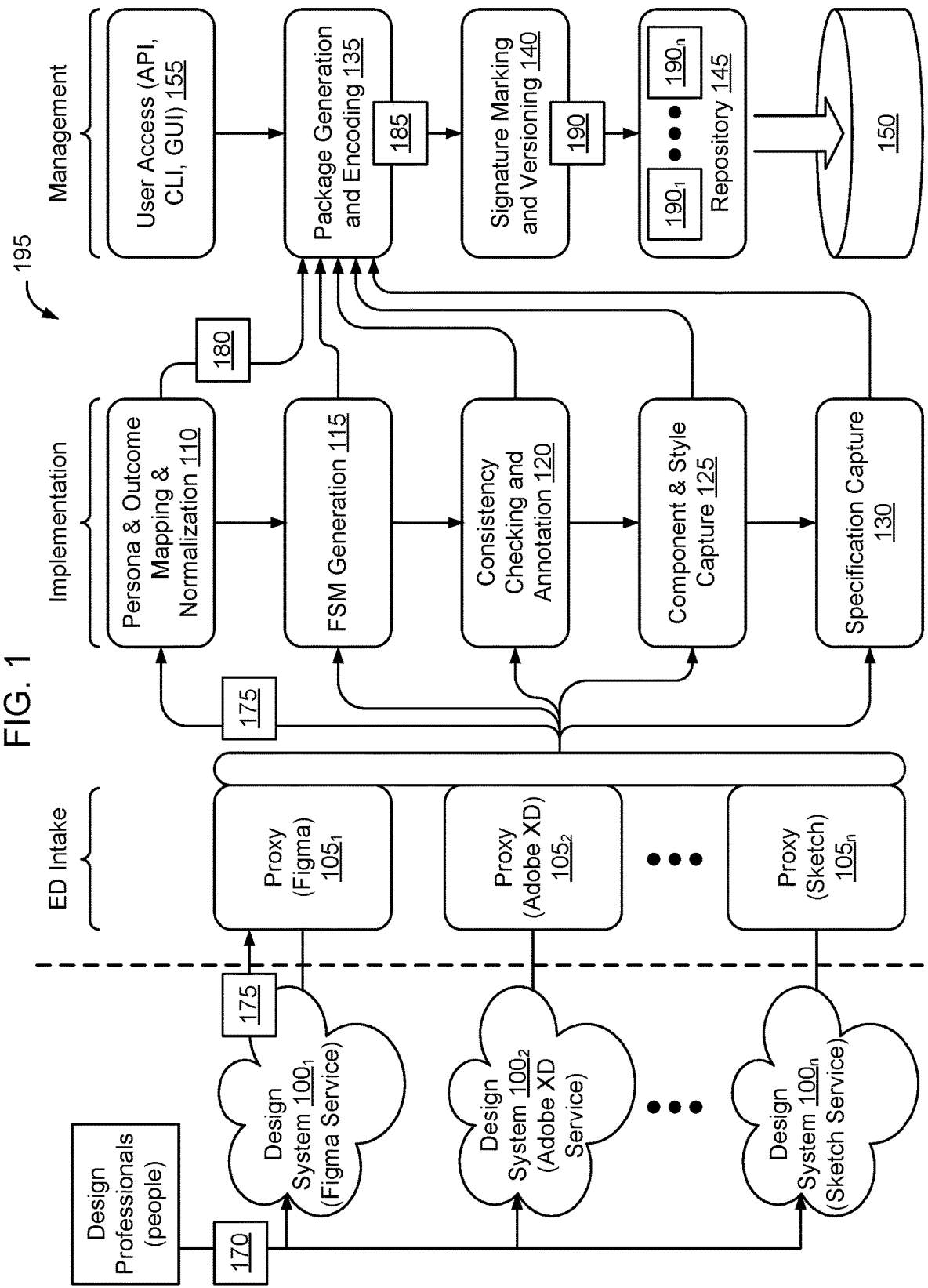
FIG. 1 is a functional block diagram of an example Experience Design Codification and Management System (EDCMS) interfaced with external user experience design systems, according to some embodiments.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Storage systems are used to provide storage services for host applications. When a host application wants to have data stored on a given storage system, the necessary storage volumes are created on the storage system by interacting with a user interface to the storage system. Humans can interact with the storage system, and likewise other automated processes can interact with the storage system.

Any interaction, whether it be between a human actor and a machine such as a storage system, or between two computer implemented systems, constitutes a "user experience" with a product. User experience design is the process of supporting user behavior through usability, usefulness, and desirability provided in the interaction with a product. Although an example system for codifying user experience designs and managing the codified user experience designs will occasionally be described in the context of codifying and managing user experience designs that are configured to enable users and storage systems to interact, it should be understood that embodiments may be used in many contexts, and are not limited to use in the context of codifying and managing user experience designs in the context of a storage system.

An example of a user experience design might be, for example, a Graphical User Interface (GUI) component or set of screens that are configured to enable a user to access a particular feature on a storage system. User experiences are designed, for example using design systems 100, to enable the graphical user interface to be used to achieve a particular objective. In the context of a GUI that is used to interface a software program, the term "user experience design", as used herein, is used to refer to a set of graphic components and transitions between states that enable a user to navigate, through the GUI, to enable the user to access the intended feature of the software program. In the context of a CLI, the term "user experience design" is used to refer to a selected set of scripts that are arranged in a package, in which each package contains an ordered set of API calls and input parameters, that are arranged to enable the user to access the intended objective. In the context of an API, the term "user experience design" is used to refer to a selected set of files that are arranged in a playbook, in which each file contains an ordered set of API calls and input parameters, that enable the user to access the intended objective.

Conventionally, user experience designs would be created by experience designers. For example, if a new feature is to be added to a software product, and the software product has a graphical user interface (GUI), often the GUI will need to be modified to enable the users to access the new feature of the software product. Stated differently, a new user experience will need to be created (designed) to enable the user to access the new feature of the software product. To create the new user experience, a software interaction design professional would create a version of how the GUI may be configured, to enable a person to access the new feature through the software product's GUI. The initial version of the changes to the GUI might be created by the design professional using a design tool such as Figma, Adobe XD, Sketch, or by manually diagramming the GUI experience.

The user experience design would then be reviewed by the design professionals, the product managers responsible for enabling the new feature in the software product, the product architects responsible for designing and including the new feature in the software product, and engineers responsible for actually implementing the GUI from the mockup provided by the design professional. After agreeing on the details of the user experience design, the engineers would implement the user experience design in software to add the user experience design to the software product GUI. The GUI would then be tested to ensure that the new feature of the product is actually accessible via the GUI. Often this process would iterate multiple times from any stage back to the original design phase, which can cause delays in implementing new features in the software product. Additionally, where the new feature is intended to be accessed using multiple different user experience designs, such as by a CLI as well as a GUI, each of the user experience design would need to go through this process.

Moreover, the conventional process of creating user experience designs is a manual process that requires each participant to keep track of the latest version of the user experience design. In an environment where the user experience design is changing frequently, for example due to architecture changes, implementation approach changes, or due to market/customer requirement changes, this may be difficult to implement. For example, the design professionals and product development team may revise a user experience design, but the engineers tasked with implementing the user experience design may be working on an earlier version of the user experience design.

In related U.S. patent application Ser. No. 17/277,542, filed Jan. 18, 2022, entitled Method and Apparatus for Codifying User Experience Designs and Managing the Codified User Experience Designs, an Experience Design Codification and Management System (EDCMS) system is described. The content of U.S. patent application Ser. No. 17/277,542 is hereby incorporated herein by reference.

Specifically, U.S. patent application Ser. No. 17/277,542, describes a method and apparatus that is configured to retrieve a user experience definition 175 based on the user experience design from an external design system 100, and generate a comprehensive user experience specification 180 from the user experience definition 175. Part of the comprehensive user experience specification 180 includes HTML, JavaScript and Cascading Style Sheets (CSS) describing the graphical aspects of the user experience design, as well as JavaScript Object Notation (JSON), eXtensible Markup Language (XML) or YAML code created based on the finite state machine generated from the user experience definition 175. The EDCMS 195 then packages and encodes the comprehensive user experience specification to create a codified user experience design 185 from the comprehensive user experience specification 180. The codified user experience design 185 is then versioned and digitally signed, and the versioned and signed codified user experience design 190 is stored in a user experience design repository 145.

By automatically generating a codified user experience design 185 from a user experience design 170, it is possible to provide engineers with a codified version of the intended user experience design 170, which includes HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented. This eliminates communication errors that might occur between the design professionals and engineers, because the engineers are automatically provided with a packaged and encoded codified user experience design 185, that is generated from the user experience design 170. By signing and versioning the codified user experience specification 190, and automatically entering the signed and versioned codified user experience 190 in a user experience design repository 145 where it can then be checked out/checked in, as necessary, it is possible to ensure that everyone is working to implement the correct version of user experience design 170. This facilitates collaboration by preventing different members of the design team from working toward implementation of different versions of the user experience design 170.

FIG. 1 is described in greater detail in U.S. patent application Ser. No. 17/277,542, and is a functional block diagram of an example Experience Design Codification and Management System (EDCMS) 195, according to some embodiments. As shown in FIG. 1, in some embodiments design professionals (people) use existing experience design tools 100 to create user experience designs 170. Example existing design tools include design systems $100_1$-$100_n$, which might be for example an online design system tool such as Figma $100_1$, Adobe XD $100_2$, or a Sketch $100_n$. Many external design systems 100 might be used, depending on the implementation. Additionally, in some embodiments, user experience designs may be created manually, i.e. without the help of tools such as Figma or Adobe XD, and then processed by a proxy 105 configured to perform image processing of the manually created design. It should be noted that the design systems $100_1$-$100_n$, are outside of the EDCMS 195, as indicated by the vertical dashed line separating the external design systems 100 from the components of the EDCMS 195.

In some embodiments, the EDCMS 195 includes an experience design intake section configured to interact with the design systems $100_1$-$100_n$, to retrieve user definitions 175 based on the user experience designs 170 that have been created by the design professionals using these external systems 100. For example, in some embodiments the EDCMS 195 includes a set of proxies $105_1$-$105_n$ configured to interact with each respective design system $100_1$-$100_n$. As an example, if the Figma Service (design system $100_1$) enables external access at a particular URL, the Figma proxy $105_1$ may be configured to access the external Figma Service URL, request a design created by a particular design professional or team of design professionals, and then download the requested user experience definition 175. In some embodiments, each proxy operates in a stateless manner, and makes use of publicly available API interfaces for the experience design platforms 100. Although FIG. 1 shows a one-to-one correspondence between proxy 105 and design system 100, it should be understood that in some embodiments a given proxy 105 may be configured to interact with more than one design system 100, or that a single proxy 105 may be used to interact with all of the design systems 100.

According to some embodiments, the EDCMS 195 is configured to require the design professional to include experience metadata 250 (see FIG. 2) describing the intended environment of the software interaction experience.

The experience metadata 250, in some embodiments, includes information about who (the persona 205) the software interaction experience is being designed for. Different types of software users (different personas) might be provided with different software interaction experiences. For example, a system administrator may be given a different set of experiences than a normal user. Other personas might be a data center manager, network manager, software engineer, or other similar title. Personas may also be specified by capturing what the roles do, such as server administrator, storage administrator, backup administrator, filesystem user, auditor, security administrator, etc. In addition to specifying the persona 205, in some embodiments the experience metadata 250 also includes information about when, in the product lifecycle 210, the person specified in the persona metadata 205 is expected to encounter the software interaction experience.

In some embodiments, the experience metadata 250 includes information about the intended outcome of the user experience design 170. An "outcome", as that term is used herein, is used to refer to the objective of the software interaction experience. For example, if the software interaction experience has been created to enable a user to create a storage volume on a storage system, that would be the "outcome" that the design professional would specify in the outcome 215 aspect of the experience metadata 250. Other outcomes might include initial configuration of a system, setting up sub-tenants on a leased storage system, creating and mapping Logical Unit Numbers (LUNS) to hosts, monitoring system behavior, creating custom dashboards, etc. Many possible outcomes exist, although it would also be expected that there would be many similar outcomes that design professionals would create for different software products.

In some embodiments, the experience metadata 250 includes information about the particular mode of consumption 220, i.e. how a user is to be presented with the software interaction experience. Example modes 220 might include a Graphical User Interface (GUI) such as on a browser or on a mobile application, an Application Program Interface (API), a Command Line Interface (CLI), a Continuous Integration/Continuous Delivery (CI/CD) system, or another form or mode of consumption of a user experience.

In some embodiments, the experience metadata 250 includes information about how the experience is achieved. This is the workflow 225 that is used to achieve the intended outcome. For a GUI based user experience design 170, the workflow specifies the human interaction with screen states and transitions between states.

Figure 2:
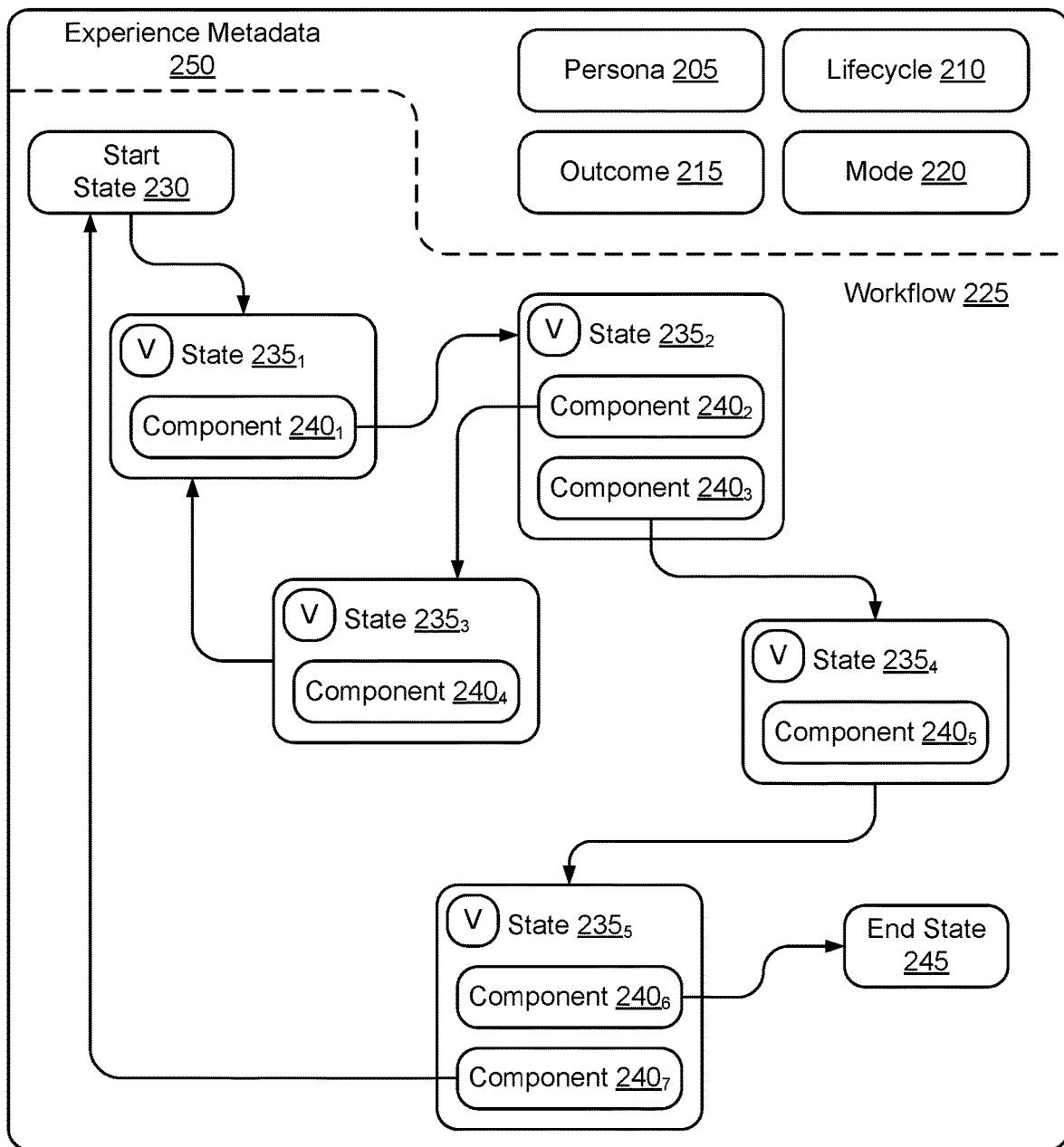
FIG. 2 is a functional block diagram of example experience design metadata, according to some embodiments.

FIG. 2 is a functional block diagram of example experience design metadata 250, according to some embodiments. As shown in FIG. 2, in some embodiments the user experience definition 175 metadata 250 includes the persona 205, lifecycle 210, outcome 215, and mode of consumption 220. In addition, the user experience definition 175 metadata 250 includes workflow metadata 225 specifying a series of states 230, transitions between states, components 240, and variability information (V).

In the example workflow 225 shown in FIG. 2, the workflow metadata 225 specifies a start state 230 and a subsequent transition to state $235_1$. In the context of a GUI, the start state might be encountered when the user starts the software application and state $235_1$ might be displaying an initial screen on the GUI that includes component $240_1$. The workflow metadata 225 specifies that, when the user interacts with component $240_1$, that the experience should transition to state $235_2$ containing components $240_2$ and $240_3$. The workflow metadata 225 further specifies state transitions that occur in connection with each of the components until an end state 245 is reached. In some embodiments, the end state 245 is associated with the outcome 215. Although FIG. 2 shows an example in which the workflow metadata 225 has one end state 245, it should be understood that there may be more than one end state 245, depending on the implementation. It should be understood that the example shown in FIG. 2 is merely one example of an experience design metadata, and it would be expected that different experience designs could vary considerably from the example shown in FIG. 2. Additionally, while FIG. 2 shows the example workflow in the form of a graph, the workflow may also be specified in a textual manner, for example in a plain text language file.

Once the user experience design 170 has been created, the EDCMS 195 accesses and obtains a copy of the user experience design 170 from the design system 100. As used herein, the term "user experience definition 175" is used to refer to a set of one or more files that are associated with the user experience design 170, and which are retrieved by the EDCMS 195 from the external design system 100 after the user experience design 170 has been created on the external design system 100. The particular format of the files which comprise the user experience definition 175 will depend on the syntax used by the external design system 100 to describe the user experience design 170. In some embodiments, when the user experience definition 175 is retrieved by the EDCMS 195, the EDCMS checks for the presence of the required experience metadata 250 and, if any user experience metadata 250 is missing, prompts are generated via user access interface 155 to request that the experience metadata 250 be added to the user experience definition.

In some embodiments, the implementation layer processes the user experience definition 175 to create a comprehensive user experience specification 180. The implementation layer, in some embodiments, includes a persona and outcome mapping and normalization subsystem 110, a finite state machine (FSM) generation subsystem 115, a consistency checking and annotation subsystem 120, a component and style capture subsystem 125, and a specification capture subsystem 130. Although FIG. 1 shows the user experience definition 175 being input to the persona and outcome mapping and normalization subsystem 110, it should be understood that the user experience definition 175 may be simultaneously input to each of the subsystem 110, 115, 120, 125, 130 at the same time. Likewise, although FIG. 1 shows arrows extending between the subsystem 110, 115, 120, 125, 130 from top to bottom, it should be understood that the subsystems may be used in any order, and that the subsystems may process the user experience definition 175 independently, depending on the implementation.

In some embodiments, the outcome mapping and normalization subsystem 110 captures the target persona from persona metadata 205 and the target outcome from outcome metadata 215 and translates the persona 205 and outcome 215 into a standard taxonomy of personas and outcomes. For example, if the target persona specified in persona metadata 205 of the user experience definition 175 was "sys admin", and the standard taxonomy included "system administrator" as one of the standard personas, the outcome mapping and normalization subsystem 110 would change the experience metadata 250 such that the experience metadata 250 in the comprehensive user experience specification 180 referred to the intended persona using the term "system administrator". In some embodiments, the persona and outcome mapping and normalization subsystem 110 uses data and textual analytic techniques to implement the mapping and normalization of persona metadata 205 and outcome metadata 215.

In some embodiments, the finite state machine generation subsystem 115 uses the knowledge of the start state 230, incrementally captures state transition events and actions, incrementally captures the contents of each state, and incrementally captures the variable/invariable nature of each state. In some embodiments, the finite state machine generation subsystem 115 uses the workflow metadata 225 to build a Mealy machine, in which state transitions depend on the current state plus inputs, or a Moore machine, in which state transitions do not depend on the inputs, but only depend on the current state, and produces a formal, intermediate representation of a finite-state machine. In some embodiments, the finite state machine generation subsystem 115 also runs one or more sanity checks on the finite state machine, to ensure that the finite state machine meets a set of pre-requisite properties for experience designs. Example sanity checks might include a set of Boolean rules, such as "before a page loads, x event is required to happen."

The consistency checking and annotation subsystem 120, in some embodiments, determines which elements of the user experience definition 175 are variable, and which are absolutely required, and annotates the comprehensive user experience specification 180 to indicate which elements are able to be varied by the engineers when implementing the comprehensive user experience specification 180. For example, in FIG. 2, each state has a variability V specified, which indicates whether and to what extent the particular state is variable or whether any of the components of the state are variable. An example variability measure may be to specify that the particular color that was selected is variable, such that the component or the state may be adjusted to automatically use one of a standard set of colors. Another example variability measure may be to allow for some latitude as to the particular placement of the component on the interface design. The consistency checking and annotation subsystem 120, in some embodiments, uses this variability information as well as heuristics, to annotate which aspects of the design are variable and by what percentage or other quantity the aspect may be varied in the final user experience. In some embodiments, the consistency checking and annotation subsystem 120 uses the same process to also check the styles of each of the states, to determine whether the styles used in each of the states are variable. Style consistency and annotation can be implemented for each state as well, and can be implemented at the same time as the components are processed by the consistency checking and annotation subsystem 120 or can be processed separately from the components.

The component and style capture subsystem 125, in some embodiments, conducts either a depth-first or breadth-first walk of the finite state machine graph, marking visited states along the way, to identify all components of the finite state machine. The component and style capture subsystem 125 compares the components used in the finite state machine with a store of known components in database 150 and, if a new component is detected that is not contained in the store of known components, adds the new component to the store of known components. In this manner, a store of known components can be incrementally built over time by the EDCMS 195. In some embodiments, the data store of known components is used by the consistency checking and annotation subsystem 120 (described above) when checking components of a user experience definition 175 for consistency with previous versions of the same components. Components in the data store of known components may be indexed, within the namespace of the experience at hand, as well as by its version, signature, and other unique fields, depending on the implementation. In some embodiments, if a component or style in the experience definition matches a known component or style in the data store of known components or styles, the correspondence is noted in the comprehensive user experience specification.

In some embodiments, the EDCMS 195 includes a specification capture engine 130. In some embodiments, this subsystem is configured to convert all parts of the comprehensive user experience specification 180, from the persona and mapping normalization subsystem, the finite state generation subsystem 115, the consistency checking and annotation subsystem 120, and from the component and style capture subsystem 125, into a standard versioned stylized, codified specification. The specification, in some embodiments, is expressed in human-readable and machine-readable languages and includes, for example, HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

The finite state machine defines states and transitions between states, which are able to be converted to JSON, XML, or YAML to be output in code form as a comprehensive user experience specification 180 for use by engineers to implement the user experience design 170. Annotations may be added to the JSON, XML, or YAML code as comments, to thereby enable all aspects of the user experience definition 175 to be specified in the JSON, XML, or YAML that is used to implement the comprehensive user experience specification 180.

In some embodiment, a package generation and encoding subsystem 135 encodes the comprehensive user experience specification 180 as well as artifacts received from each of the implementation subsystems. In some embodiments, the package generation and encoding subsystem 135 operates in a request/response manner with each of the subsystems 110, 115, 120, 125, 130, to capture partial results and store the partial results in database 150. The package generation and encoding subsystem 135 also packages the comprehensive user experience specification 180 to enable all aspects of the comprehensive user experience specification 180 to be included in the codified user experience design 185.

In some embodiments a signature marking and versioning subsystem 140 receives the comprehensive user experience specification 180 and signs and versions the comprehensive user experience to create a versioned and signed codified experience specification. In some embodiments, the signature is implemented using a hash to create a digital signature that is virtually guaranteed to be universally unique. An example hash might be implemented, for example, using a Secure Hash Algorithm such as SHA-256, which creates a 32-byte hash signature. Other hash algorithms may similarly be used, depending on the implementation. In some embodiments the versioning process assigns a version number to the versioned and signed codified experience specification 190 to enable each version of a given user experience design to be specifically identified. Example version number might be 1.1, 1.2, 1.2.1, etc., depending on the implementation. In some embodiments, the user is prompted to provide input as to how the user experience design should be versioned. The package, its signature, and its version identifier, constitute a unique artifact for a particular experience design. Any future change to the design will result in a new signature and a new version number, to enable all versions of the user experience design to be uniquely identified within the user experience design repository 145.

Figure 3:
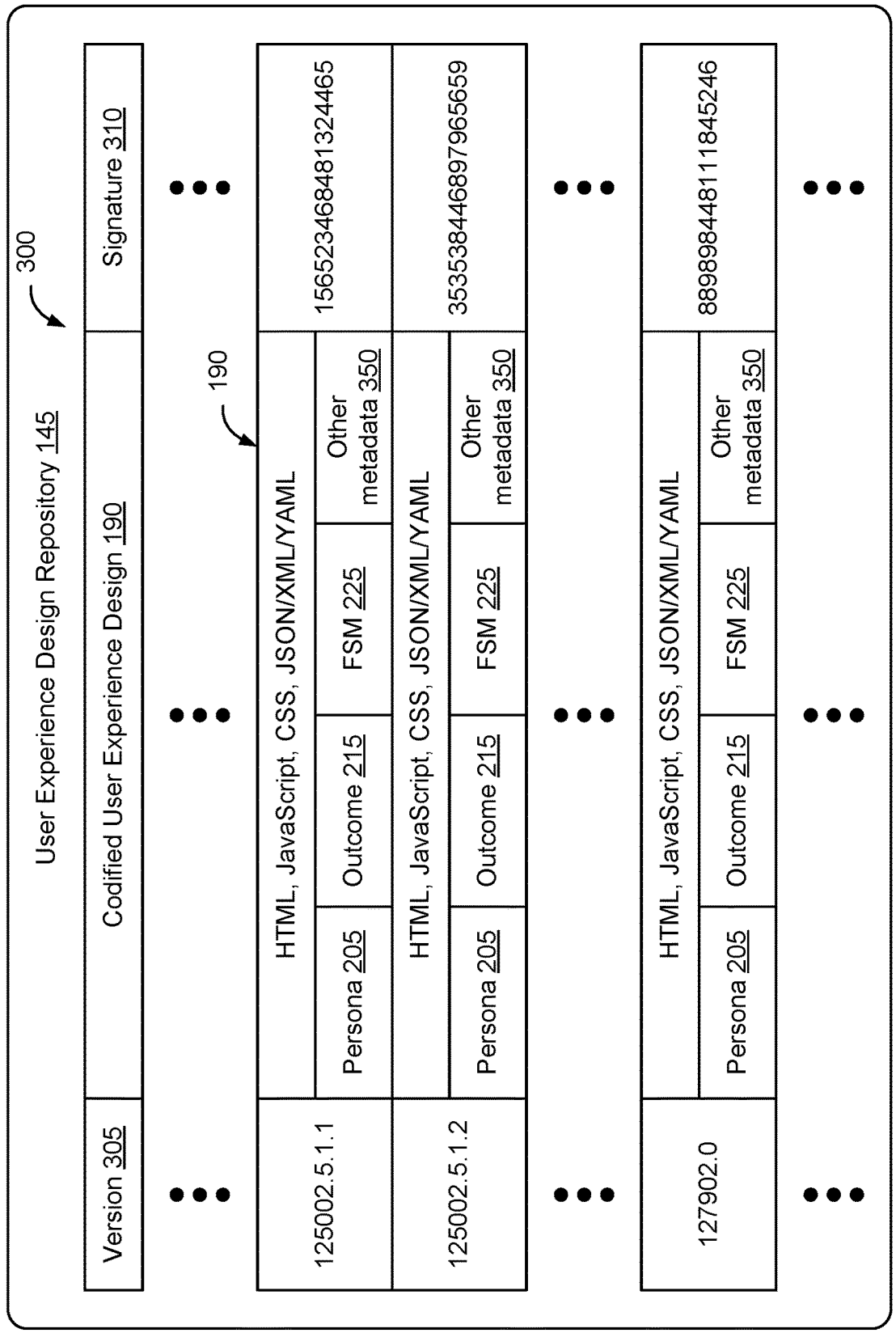
FIG. 3 is a functional block diagram of an example data structure configured to implement a codified user experience design repository of the EDCMS of FIG. 1, according to some embodiments.

Codified user experience designs 190, in some embodiments, are stored in a user experience design repository 145. FIG. 3 is a functional block diagram of an example data structure configured to implement a user experience design repository 145 of the EDCMS of FIG. 1, according to some embodiments. As shown in FIG. 3, in some embodiments the user experience design repository 145 includes a data structure 300 having entries containing versioned and signed codified experience specifications 190. Each entry has a version number 305 that uniquely identifies the experience specification 190 and a signature 310 that is able to be used to verify the content of the experience specification 190. The user experience specification includes the experience metadata 225, such as persona 205, outcome 214, finite state machine 224, annotations, and the other experience metadata described in connection with FIG. 2. The user experience specification also includes the HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

Users/customers consume solutions through multiple avenues, depending on what works best for their organization. Example ways of accessing a feature of a storage system, for example, might include a Graphical User Interface (GUI), a Command Line Interface (CLI), or directly via an Application Programming Interface (API). The problems the users are trying to solve, and the outcomes they are trying to achieve, remain the same regardless of the method of consumption.

Accordingly, it is important that the experience and achievable outcomes remain consistent between the methods of consumption. Unfortunately, that is not always the case. Conventionally, manual processes are used to create all three layers, which can often result in inconsistent outcomes between the three types of user interfaces. For example, there may be multiple APIs that can be used to implement the same functionality on the storage system, and therefore it is possible that the developer tasked with implementing the GUI version of the user experience might select a different API than the developer tasked with implementing the CLI version of the user experience. This can result in different performance profiles for the different modes of consumption. Further, to ensure that all of the user interfaces work correctly, it is necessary to independently test each of the methods of consumption (GUI, CLI, API).

In some embodiments the EDCMS is configured to interface with design systems to retrieve a codified user experience definition based on a graphical user experience design, and generate corresponding Command Line Interface (CLI) packages and Application Programming Interface (API) playbooks from the codified graphical user experience design.

Codified graphical user experience design includes finite state machine (FSM) metadata, logic describing the graphical aspects of the user experience design, and logic describing states of the user experience design and transitions between states. A GUI to API/CLI translator uses the codified graphical user experience design to automatically create corresponding CLI packages and API playbooks. The translator walks the FSM. For each visited state, a state based functional intermediate code package is created including the one or more API call basic blocks associated with API calls to be implemented at that state, and parameter definitions for each API call at that state. For each state transition, conditional intermediate code is created and attached to the API call basic blocks. The state based functional intermediate code packages with attached conditional intermediate code are used to create a CLI package or an API playbook based on the codified graphical user experience design.

Figure 4:
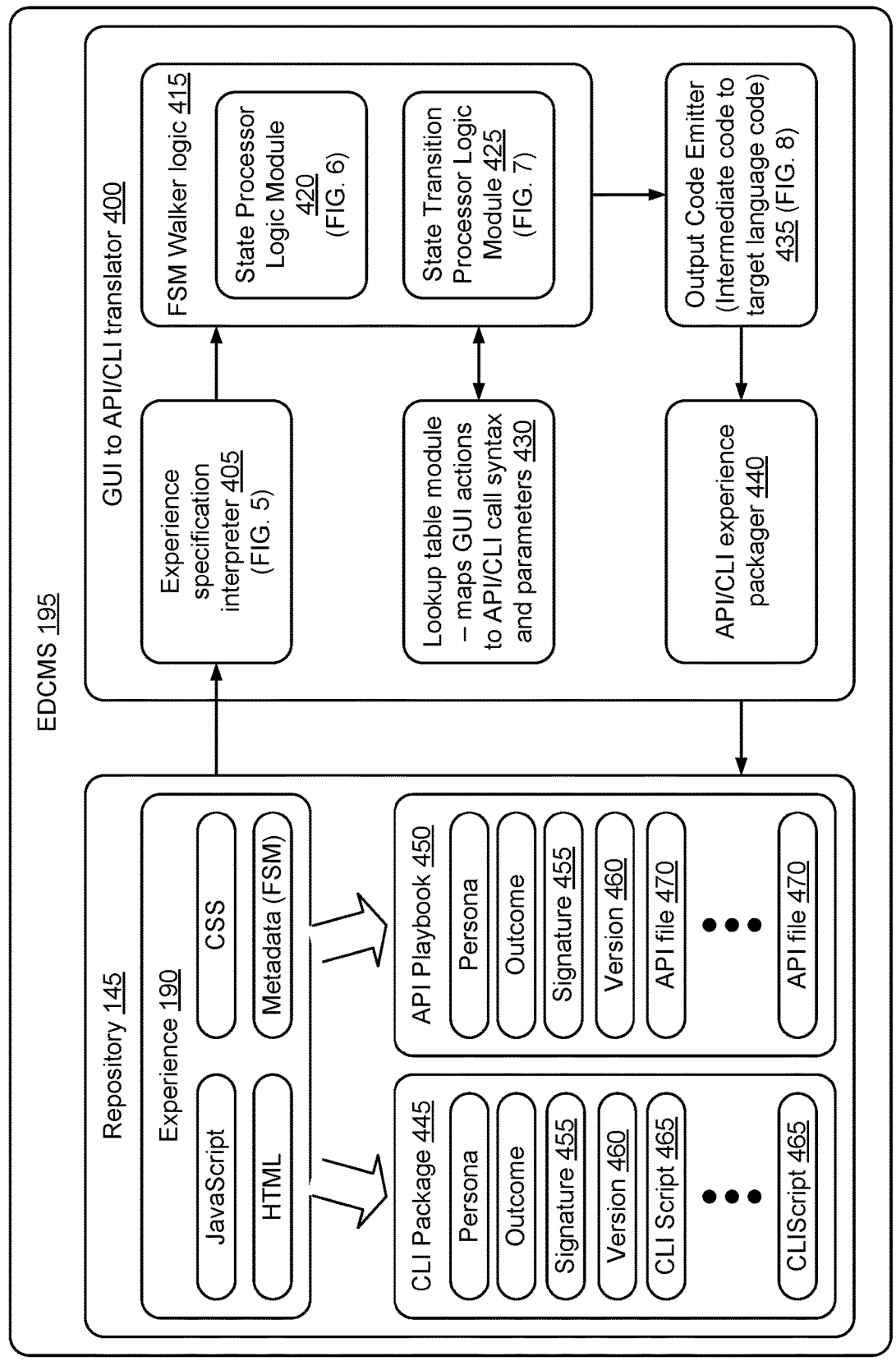
FIG. 4 is a functional block diagram of an example EDCMS system having a GUI to API/CLI translator configured to automate creation of Command Line Interface (CLI) packages and Application Programming Interface (API) playbooks from a codified graphical user experience design, according to some embodiments.

FIG. 4 is a functional block diagram of an example EDCMS system having a GUI to API/CLI translator 400 configured to automate creation of Command Line Interface (CLI) packages 445 and Application Programming Interface (API) playbooks 450 from a codified graphical user experience design, according to some embodiments. As shown in FIG. 4, in some embodiments the EDCMS 195 includes an automated GUI to API/CLI translator 400 configured to build CLI user experience designs and API user experience designs based on a codified graphical user experience design.

The codified graphical user experience design specifies the graphical elements that a user interacts with to achieve the outcome associated with the user experience design. The user experience design also includes a finite state machine that specifies the transitions between states of the graphical interface, as the user selects particular options within the user experience design. However, the objects associated with the user experience design are not linked to particular functions when the user experience design is first created. Accordingly, although the user experience design allows the user to click through the user experience and enter various pieces of information, the interactions with the codified user experience design need to be linked to particular function calls to enable the codified user experience design to contain logic that can be used to enable the user experience design to be used to functionally interact and control operation of an application.

According to some embodiments, the GUI to API/CLI translator 400 has an experience specification interpreter 405 configured to retrieve a codified user experience design that has been created for implementation on a graphical user interface. As used herein, the term "codified graphical user experience design" is used to refer to a codified user experience design that was created for implementation on a graphical user interface (GUI). The experience specification interpreter 405 reads the persona and outcome associated with the codified graphical user experience design, the finite state machine (FSM), the consistency checker rules, and the object annotations encoded in the codified graphical user experience design. In some embodiments, the experience specification interpreter also reads the version number associated with the codified graphical user experience design, to enable the version number to be associated with a CLI package 445 and/or API playbook 450 generated by the GUI to API/CLI translator 400.

Figure 5:
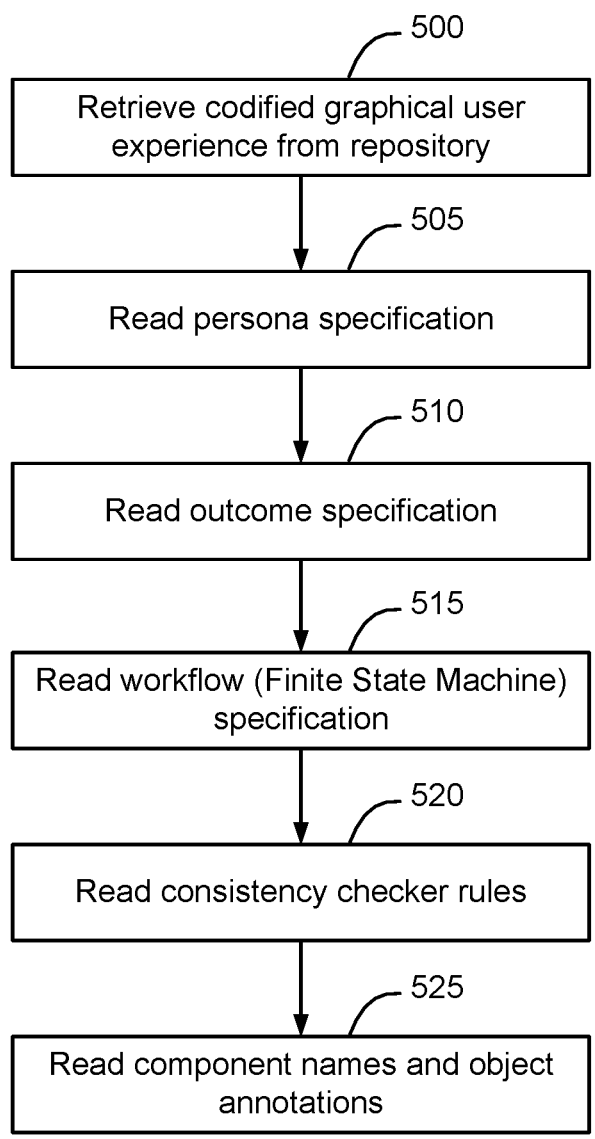
FIG. 5 is a flow chart of an example process implemented by an experience specification interpreter of the GUI to API/CLI translator of FIG. 4, according to some embodiments.

FIG. 5 is a flow chart of an example process implemented by an experience specification interpreter of the GUI to API/CLI translator 400 of FIG. 4, according to some embodiments. As shown in FIG. 5, in some embodiments the experience specification interpreter 405 retrieves a codified graphical user experience design 190 from the user experience design repository 145 (block 500). The experience specification interpreter 405 reads the persona specification (block 505) and reads the outcome specification (block 510). The persona specification and outcome specification will be included in the final CLI package 445 and API playbook 450 by the API/CLI experience packager 440 once the CLI package 445 or API playbook 450 has been generated. Including the outcome and persona in the CLI package 445 and API playbook 450 allows the repository 145 to be searched using these attributes, for example when looking for CLI packages or API playbooks that have been designed for particular personas and outcomes.

The experience specification interpreter 405 reads the workflow associated with the codified graphical user experience design by reading the Finite State Machine (FSM) (block 515). The FSM is used by a finite state machine walker 415 to process the states and state transitions to create the CLI user experience designs and API user experience designs, as discussed in greater detail below in connection with FIGS. 6 and 7.

The experience specification interpreter 405 also reads the consistency checker rules (block 520) and the object annotations (block 525). The consistency checker rules, component names, and object annotations are provided to the FSM walker logic 415 to facilitate selection of API call syntax and parameters when walking the FSM to create the API and CLI experiences.

As shown in FIG. 4, in some embodiments the GUI to API/CLI translator 400 includes FSM walker logic 415 configured to walk the FSM, starting at the start state in a breadth first or a depth first manner. The FSM walker logic 415 walks all states of the FSM, marking each visited state, and repeats until all the end states of the FSM have been reached. In some embodiments, the FSM walker logic 415 includes a state processor logic module 420 configured to process each visited state, for example to identify actions associated with the state and parameters captured at that state. An example process implemented by the state processor logic module 420 is described in connection with FIG. 6. In some embodiments, the FSM walker logic 415 also includes a state transition processor logic module 425 configured to process state transitions specified by the FSM, for example to capture conditions that lead to state transitions. An example process implemented by the state transition processor logic module 425 is described in connection with FIG. 7.

Figure 6:
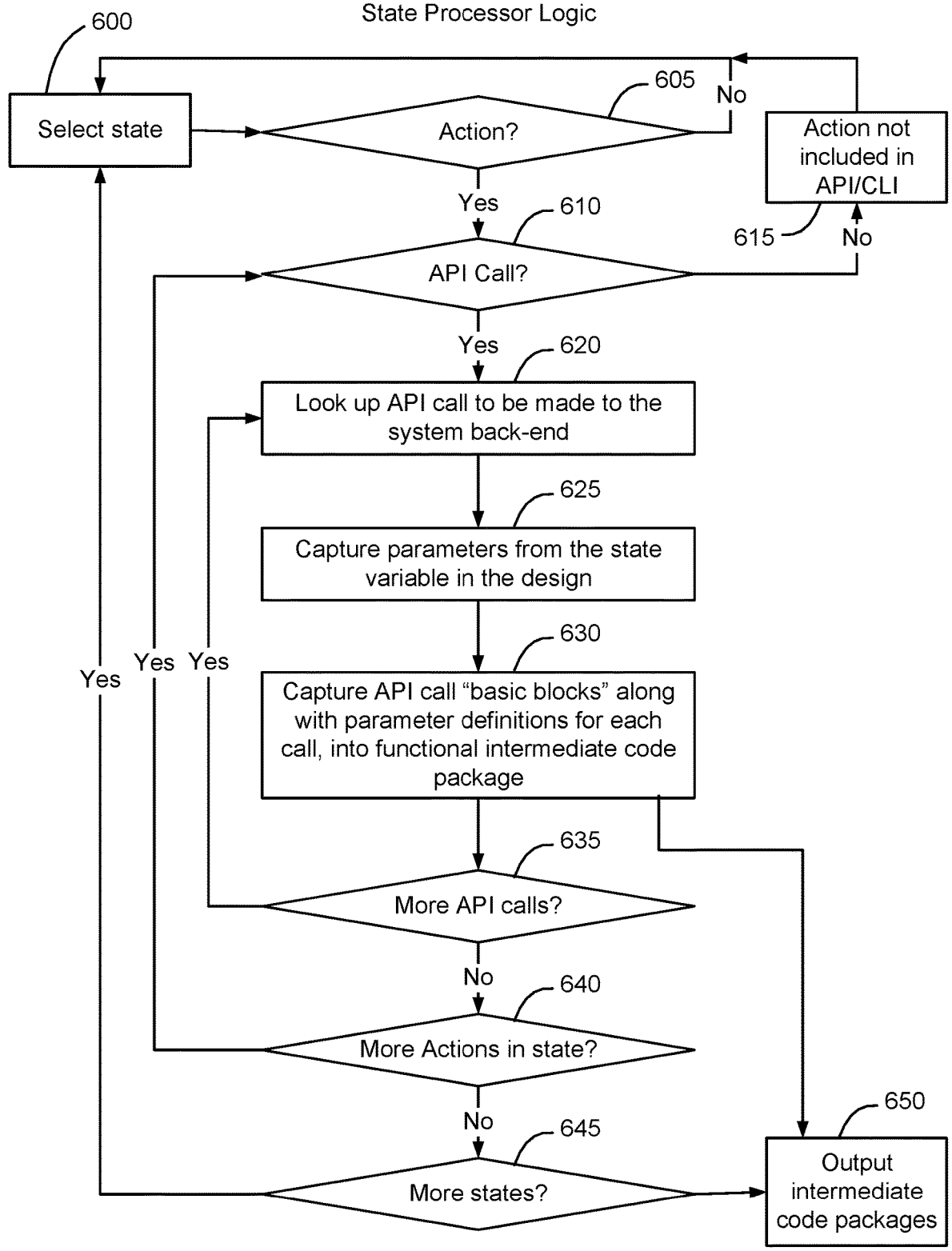
FIG. 6 is a flow chart of an example process implemented by a state processor logic module of the GUI to API/CLI translator of FIG. 4, according to some embodiments.

FIG. 6 is a flow chart of an example process implemented by a state processor logic module of the GUI to API/CLI translator 400 of FIG. 4, according to some embodiments. Starting at the start state 230, the state processor logic module 420 selects a state (block 600), and determines if there is an action associated with the selected state (block 605). Example actions might include, for example, a button click on an object, entry of a value of a parameter in a particular field, etc. In some embodiments, the state processor logic module 420 uses the component names and object annotations to identify objects present on the graphical experience design in the selected state, and uses the component names and object annotations to identify the actions associated with the state.

If there is no action in a particular state (a determination of NO at block 605), the state processor logic module 420 returns to block 600 and selects a subsequent state. If the state processor logic module 420 determines that there is one or more actions associated with the selected state (a determination of YES at block 605), the state processor logic module 420 determines whether there is an API call associated with the action (block 610). Some actions, such as refresh actions or choosing between data entry vs. uploading a file, will not have associated API calls. These actions are not included in the API or CLI experience specifications. Accordingly, if the state processor logic module determines that the action is not associated with an API call (a determination of NO at block 610), the action is not included in the API or CLI experience specification, and the process returns to block 600 where the state processor logic module selects a subsequent state.

When the state processor logic module 420 determines that the action requires an API call (a determination of YES at block 610), the state processor logic module 420 performs a lookup in lookup table module 430 to determine which API call is required to implement the action (block 620). In some embodiments, the GUI to API/CLI translator 400 includes a lookup table module 430, that maps GUI actions to API/CLI call syntax and parameters. The state processor logic 420, upon determining that an action requires one or more API calls, implements a lookup process in the lookup table module 430 to determine the correct API/CLI call syntax to implement the action.

As shown in FIG. 6, in some instances the API call will require a user to input one or more state variables. Accordingly, the state process logic module 420 also captures the parameters from the state variable in the design (block 625). Example parameters might include, for example, a user ID, user password, IP address input value, etc. The state processor logic module combines the API call basic blocks, along with parameter definitions for each call, into a functional intermediate code package (block 630) which is saved to be included in the final output intermediate code package 650.

Some actions may require more than one API call. Accordingly, in some embodiments the state processor logic module 420 determines if there are any additional API calls associated with the action (block 635). If there are additional API calls (a determination of YES at block 635) the state processor logic module 420 returns to block 620 where the API call to be made is determined from the lookup table module 430. Each API call is processed by iterating blocks 620, 625, and 630 until it is determined that there are no additional API calls associated with the action (a determination of NO at block 635).

The state processor logic module then determines if there are any additional actions in the current state (block 640). If there are additional actions in this state (a determination of YES at block 640) the state processor logic module 420 returns to block 610 where it is determined if there are any API calls associated with the action. Each action is processed by iterating blocks 610, 620, 625, and 630 until it is determined that there are no additional actions associated with the state (a determination of NO at block 640).

Once all actions of the state have been processed (a determination of NO at block 640), the FSM walker logic 415 determines whether there are any additional states (block 645). If there are additional states (a determination of YES at block 645), the process returns to block 600 where a subsequent state is selected. If there are no additional states (a determination of NO at block 645) the state processor logic module 420 determines that all states have been visited, and outputs a set of intermediate code packages 650 that were created in connection with visiting each state of the FSM.

Figure 7:
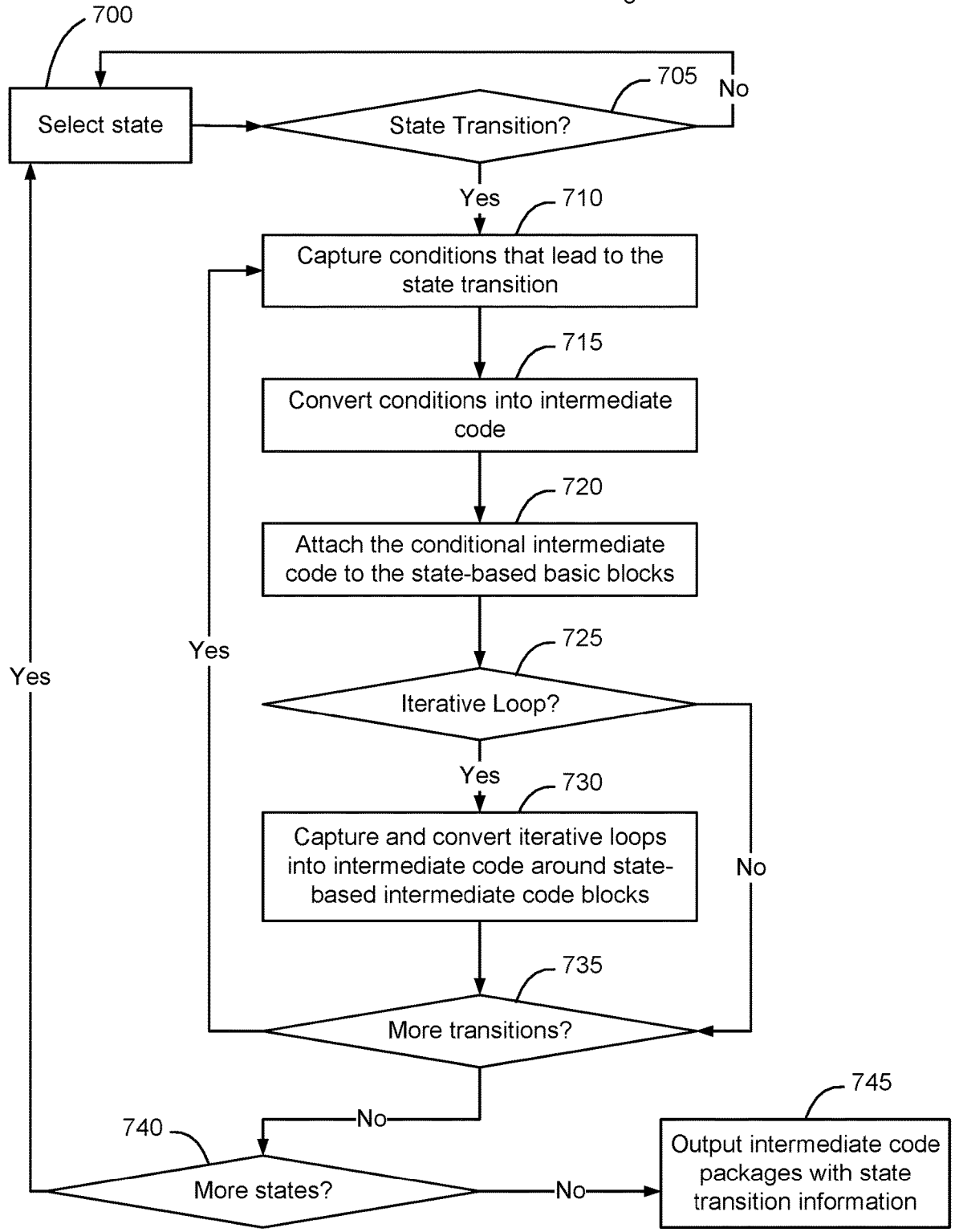
FIG. 7 is a flow chart of an example process implemented by a state transition processor logic module of the GUI to API/CLI translator of FIG. 4, according to some embodiments.

In addition to processing each state, it is also necessary to process each state transition, for example to capture conditions that lead to state transitions. FIG. 7 is a flow chart of an example process implemented by a state transition processor logic module of the GUI to API/CLI translator 400 of FIG. 4, according to some embodiments.

As the FSM walker logic 415 walks the logic of the FSM of the codified graphical user experience design, for each state (block 700) the state transition processor logic determines if the state is associated with any state-to-state transitions (block 705). In some embodiments, a state-to-state transition is a transition from the current state being processed to a subsequent state. For example, in FIG. 2 start state 230, and each of states 235$_1$-235$_5$ are associated with one or more state-to-state transitions. End state 245, by contrast, is not associated with a state-to-state transition.

The state transition processor logic module 425 processes each state of the finite state machine until all end states of the FSM have been visited. Each time the FSM walker logic 415 visits a state (block 700) the state transition processor logic module 425 determines if the state is associated with a state-to-state transition (block 705). If the state is not associated with a state-to-state transition (a determination of NO at block 705) the state transition processor logic returns to block 700 to process state transitions in connection with subsequent states of the FSM.

If the state is associated with a state-to-state transition (a determination of YES at block 705), the state transition processor logic module 425 captures conditions that lead to the state transition (block 710). The conditions that lead to the state transition are converted into intermediate code (block 715), and the conditional intermediate code is attached to the state-based API call basic blocks (see FIG. 6, block 630). In this manner, the conditions associated with arriving at a particular API call are able to be attached to the API call and associated parameters.

Some finite state machines might include an iterative loop. Iterative loops are processed in the same manner as state transitions. For example, in some embodiments the state transition processor logic module 425 determines if the FSM contains an iterative loop (block 725). If an iterative loop is identified (a determination of YES at block 725) the state transition processor logic module 425 captures and converts iterative loops into intermediate code around the state-based intermediate code blocks (block 730).

Once an initial state transition has been processed, and once any iterative loops have been processed (a determination of NO at block 725), the state transition processor logic 425 determines whether there are more state transitions from the current state to other states (block 735). Some states, such as state 235$_2$ of FIG. 2, might have multiple possible state-to-state transitions. Accordingly, if there are more possible state-to-state transitions from a given state (a determination of YES at block 735) the process returns to block 710 to capture the conditions that lead to this addition state transition. The process of blocks 710, 715, 720, 725, and 735 iterates until there are no additional state-to-state transitions associated with the current state (a determination of NO at block 735).

A determination is then made as to whether there are any additional states of the FSM (block 740). If there are additional states, the process returns to block 700 and the state transition processor logic module 425 continues to process state transitions of each of the states of the FSM until all states have been processed (a determination of NO at block 740). The state transition processor logic module 425 then outputs intermediate code packages with state transition information.

Although FIGS. 6 and 7 separately described operations performed by an example state processor logic module 420 and state transition processor logic module 425, in some embodiments these two modules collaboratively process states visited by the FSM walker logic 415. For example, as the FSM walker logic visits a state, the state processor logic module determines what actions are associated with the state, determines what API calls and parameters are required to implement the actions, and creates an intermediate code package associated with the state including the API call basic blocks along with parameter definitions. At the same time, the state transition processor logic module processes the state transitions from the state, converts the state transition conditions into intermediate code, and attaches the conditional intermediate code to the state-based basic blocks. This enable the FSM walker to output intermediate code packages that include both the state information (what API calls and parameters associated with the API calls) are associated with visiting this state of the FSM, and what state transitions are possible from this state and the conditions that result in the state transitions.

These intermediate code packages are provided to an output code emitter 435 that uses the intermediate code to create target language code. Specifically, in some embodiments the output code emitter 435 uses the intermediate code packages to create associated CLI packages 445 of CLI scripts (sets of CLI prompts) and API playbooks 450 (sets of API files) that implement the codified graphical user experience design.

Figure 8:
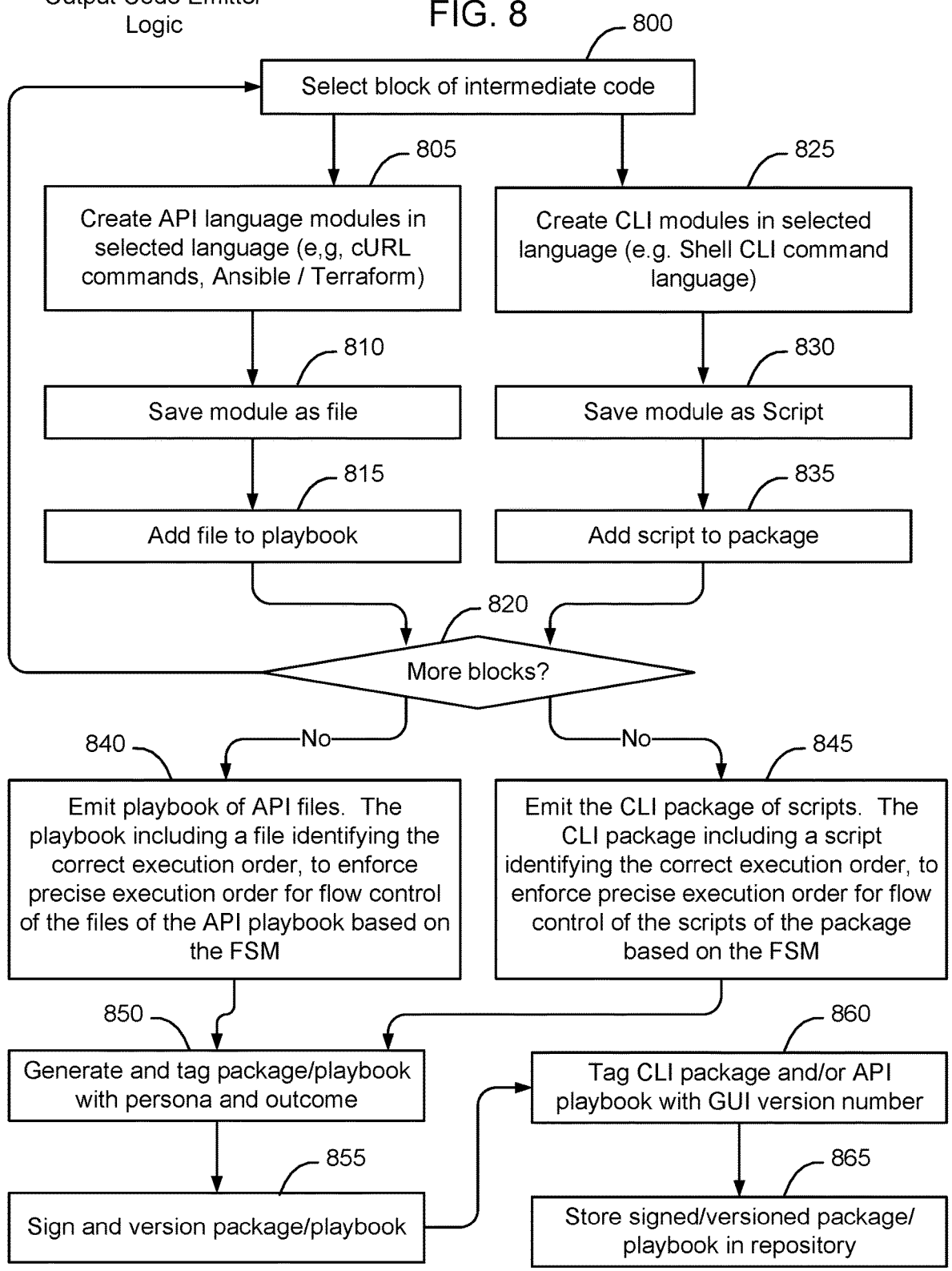
FIG. 8 is a flow chart of an example process implemented by an output code emitter of the GUI to API/CLI translator of FIG. 4, according to some embodiments.

FIG. 8 is a flow chart of an example process implemented by an output code emitter of the GUI to AP I/CLI translator 400 of FIG. 4, to generate CLI packages 445 and API playbooks 450 from intermediate code blocks, according to some embodiments. In some embodiments, the CLI packages 445 contain a set of CLI scripts 465 that provide prompts to enable a user to enter the correct information and take the correct set of actions via the CLI to achieve the intended outcome. The API playbook 450 contains a set of API files 470 that can be used to implement the intended outcome directly on the storage system.

Figure 9:
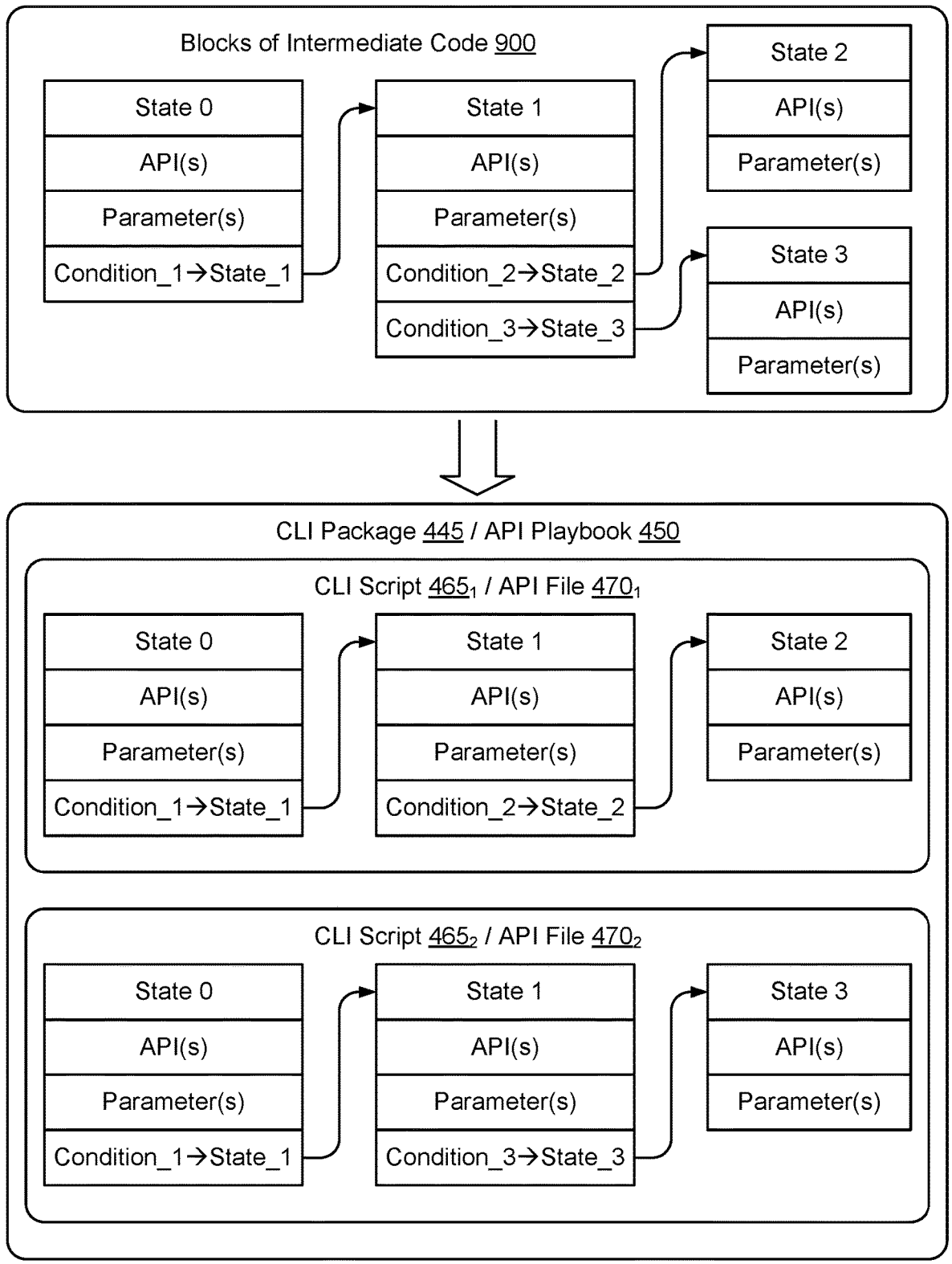
FIG. 9 is a functional block diagram illustrating creation of CLI packages and API playbooks from blocks of intermediate code, according to some embodiments.

FIG. 9 graphically shows an example way of converting a set of blocks of intermediate code to a set of CLI scripts and API files. In the example shown in FIG. 9, the finite state machine walker logic 415 identified four states, labeled state 0 (the initial state), state 1 (an intermediate state) and states 2 and 3, both of which are end states. The state processor logic module 420 determined the APIs for each of the states and added the API basic blocks and parameters to the blocks of intermediate code for each state. The state transition processor logic module identified one conditional state transfer associated with state 0 and two conditional state transfers associated with state 1. These state transfers, along with the conditional information, were added to states 0 and 1 as shown in FIG. 9.

As shown in FIG. 9, the output code emitter uses these intermediate code blocks to generate a set of CLI scripts and API files that will enable each of the end states (states 2 and 3) to be reached. Specifically, as shown in FIG. 9, since there are two end states, which are reached based on different conditions being present in state 1, the CLI package 445/API playbook 450 each include two components. A first CLI script $465_1$/API file $470_1$ is created using the blocks of intermediate code for state 0 (condition_1), state 1 (condition_2), and state 2. A second CLI script $465_2$/API file $470_2$ is created using the blocks of intermediate code for state 0 (condition_1), state 1 (condition_3), and state 3. Although FIG. 9 shows each script/file as containing a continuous link from the start state to the end state, the scripts/files may include sub-strings of code as well.

As shown in FIG. 8, in some embodiments the output code emitter logic 435 retrieves a selected block of intermediate code (block 800). If the output code emitter logic 435 is creating an API based user experience design, the output code emitter logic 435 uses the block of intermediate code to creates one or more API language modules in a selected language (block 805). Example API languages include cURL commands and Ansible/Terraform. The module is saved as a file (block 810), and added to the playbook (block 815). If there are additional blocks of intermediate code (a determination of YES at block 820), the subsequent blocks of intermediate code are similarly processed.

If the output code emitter logic 435 is creating a CLI based user experience design, the output code emitter logic 435 uses the block of intermediate code to create one or more CLI language modules in a selected language (block 825). Example CLI languages include shell CLI command languages. The module is saved as a script (block 830), and added to the package (block 835). If there are additional blocks of intermediate code (a determination of YES at block 820), the subsequent blocks of intermediate code are similarly processed.

Once all of the blocks of intermediate code have been used to create the CLI scripts and API files, the CLI scripts and API files are packaged. Specifically, as shown in FIG. 8, the output code emitter emits a playbook 450 of API files (block 840). In some embodiments, the playbook 450 includes a set of API files 780 and a file identifying the correct execution order of the API files 780, to enable a precise order of execution to be enforced. This enables flow control of the files 780 of the API playbook 450 to be specified and based on the FSM of the graphical user experience design that was used to create the API playbook 450.

Similarly, the output code emitter emits a package of CLI scripts (block 845). In some embodiments, the package includes a set of CLI scripts and a script identifying the correct execution order of the CLI scripts, to enable a precise order of execution to be enforced. This enables flow control of the scripts of the CLI package to be specified and based on the FSM of the graphical user experience design that was used to create the CLI package 445.

As shown in FIG. 4, in some embodiments the GUI to API/CLI translator 400 includes an API/CLI experience packager 440. In FIG. 8, blocks 850-865 are implemented by the API/CLI experience packager 440. Specifically, as shown in FIG. 8, in some embodiments the API/CLI experience packager 440 generates and tags the package 445/API playbook 450 generated by the output code emitter 435 with the persona and outcome of the codified graphical user experience design (block 850). As noted above, in some embodiments the experience specification interpreter 405 reads the persona and outcome associated with the codified graphical user experience design, and provides the persona and outcome to the API/CLI experience packager 440. The API/CLI experience packager 440 includes the persona and outcome in the CLI package 445 and API playbook 450, to ensure that this metadata is associated with the CLI package 445 and API playbook 450 when the CLI package 445 and API playbook 450 are stored in the user experience design repository 145.

The CLI package 445 and API playbook 450 are then signed and versioned (block 855) and stored in the user experience design repository 145 (block 865). Optionally, the CLI package 445 and API playbook 450 may be tagged with the version number of codified graphical user experience definition that was read by the experience specification interpreter 405 and used to create the CLI package 445 and API playbook 450.

By automatically creating CLI packages 445 and API playbooks 450 based on the codified graphical user experience designs, and generating the required logic to implement the codified graphical user experience design in other formats, it is possible to automatically generate a corresponding CLI-based user experience design and an API-based user experience design directly from the codified graphical user experience design. This greatly reduces the amount of work associated with creating multiple related user experience designs that are intended to enable the end user/customer to use multiple different techniques to consume a particular outcome for a particular persona on a storage system. Additionally, since the automatically generated CLI packages 445 and API playbooks 450 are directly based on the finite state machines of the codified graphical user experience designs, the CLI packages and API playbooks are much less likely to incorporate human errors than where similar packages/playbooks are manually created.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, subsystems, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of creating Command Line Interface (CLI) packages and Application Programming Interface (API) playbooks from codified graphical user experience designs, comprising:

retrieving a codified graphical user experience design, the codified graphical user experience design including persona metadata, outcome metadata, and finite state machine metadata, logic describing the graphical aspects of the user experience design, and logic describing states of the user experience design and transitions between states of the user experience design;

walking the finite state machine in a breadth first or depth first manner to visit each state of the finite state machine, identifying state transitions, and marking each visited state, until all end states of the finite state machine have been reached;

for each visited state, creating a state based functional intermediate code package, the state-based functional intermediate code package including the one or more API call basic blocks associated with API calls to be implemented at that state, and parameter definitions for each API call at that state;

for each state transition involving a transition from a state where the state transition originates to a subsequent state, creating conditional intermediate code, and attaching the conditional intermediate code to the API call basic blocks of the state based functional intermediate code package where the state transition originates; and combining the state based functional intermediate code packages with attached conditional intermediate code to create a CLI package or an API playbook based on the codified graphical user experience design.

2. The method of claim 1, wherein the step of creating state based functional intermediate code packages, for each visited state, comprises:

determining if there are any actions in the visited state;

when there are any actions in the visited state, determining if there are one or more API calls associated with the one or more actions;

determining which one or more API calls, from a set of possible API calls, are required to be made to an underlying system to implement the one or more actions;

capturing parameters associated with variables required by the one or more API calls; and creating a state based functional intermediate code package including the one or more API call basic blocks and parameter definitions for each API call.

3. The method of claim 1, wherein the step of creating conditional intermediate code, for each state transition, comprises:

capturing conditions that lead to the state transition;

converting the conditions into conditional intermediate code; and attaching the conditional intermediate code to one or more of the API call basic blocks of the state based functional intermediate code package where the state transition originates.

4. The method of claim 1, further comprising packaging the CLI package or the API playbook, and tagging the CLI package or the API playbook with the persona metadata and outcome metadata of the retrieved codified graphical user experience design.

5. The method of claim 1, further comprising signing and versioning the CLI package or the API playbook to create a signed and versioned codified CLI package or the API playbook; and storing the signed and versioned CLI package or the API playbook in a user experience design repository.

6. The method of claim 1, wherein the retrieved codified graphical user experience design has a version identifier, the method further comprising adding the version identifier of the retrieved codified graphical user experience design to the CLI package or the API playbook.

7. The method of claim 1, wherein the CLI package includes a set of CLI scripts and a script identifying the correct execution order of the CLI scripts;

wherein the script identifying the correct execution order of the CLI scripts is configured to enforce a precise order of execution of the CLI scripts to control flow of the CLI scripts to mirror be a flow of the FSM of the graphical user experience design that was used to create the CLI package.

8. The method of claim 1, wherein the API playbook includes a set of API files and an API file identifying the correct execution order of the API files;

wherein the API file identifying the correct execution order of the API files is configured to enforce a precise order of execution of the API files to control flow of the API files to mirror be a flow of the FSM of the graphical user experience design that was used to create the API playbook.

9. The method of claim 1, wherein the logic describing the graphical aspects of the user experience design includes HTML, JavaScript, and Cascading Style Sheets (CSS), and wherein the logic describing the graphical aspects of the user experience design, and logic describing states of the user experience design and transitions between states of the user experience design includes JSON, XML, or YAML code.

10. A non-transitory tangible computer readable storage medium having stored thereon a computer program for creating Command Line Interface (CLI) packages and Application Programming Interface (API) playbooks from codified graphical user experience designs, the computer program including a set of instructions which, when executed by a computer, cause the computer to perform a method comprising the steps of:

retrieving a codified graphical user experience design, the codified graphical user experience design including persona metadata, outcome metadata, and finite state machine metadata, logic describing the graphical aspects of the user experience design, and logic describing states of the user experience design and transitions between states of the user experience design;

walking the finite state machine in a breadth first or depth first manner to visit each state of the finite state machine, identifying state transitions, and marking each visited state, until all end states of the finite state machine have been reached;

for each visited state, creating a state based functional intermediate code package, the state-based functional intermediate code package including the one or more API call basic blocks associated with API calls to be implemented at that state, and parameter definitions for each API call at that state;

for each state transition involving a transition from a state where the state transition originates to a subsequent state, creating conditional intermediate code, and attaching the conditional intermediate code to the API call basic blocks of the state based functional intermediate code package where the state transition originates; and combining the state based functional intermediate code packages with attached conditional intermediate code to create a CLI package or an API playbook based on the codified graphical user experience design.

11. The non-transitory tangible computer readable storage medium of claim 10, wherein the step of creating state based functional intermediate code packages, for each visited state, comprises:

determining if there are any actions in the visited state;

when there are any actions in the visited state, determining if there are one or more API calls associated with the one or more actions;

determining which one or more API calls, from a set of possible API calls, are required to be made to an underlying system to implement the one or more actions;

capturing parameters associated with variables required by the one or more API calls; and creating a state based functional intermediate code package including the one or more API call basic blocks and parameter definitions for each API call.

12. The non-transitory tangible computer readable storage medium of claim 10, wherein the step of creating conditional intermediate code, for each state transition, comprises:

capturing conditions that lead to the state transition;

converting the conditions into conditional intermediate code; and attaching the conditional intermediate code to one or more of the API call basic blocks of the state based functional intermediate code package where the state transition originates.

13. The non-transitory tangible computer readable storage medium of claim 10, further comprising packaging the CLI package or the API playbook, and tagging the CLI package or the API playbook with the persona metadata and outcome metadata of the retrieved codified graphical user experience design.

14. The non-transitory tangible computer readable storage medium of claim 10, further comprising signing and versioning the CLI package or the API playbook to create a signed and versioned codified CLI package or the API playbook; and storing the signed and versioned CLI package or the API playbook in a user experience design repository.

15. The non-transitory tangible computer readable storage medium of claim 10, wherein the retrieved codified graphical user experience design has a version identifier, the method further comprising adding the version identifier of the retrieved codified graphical user experience design to the CLI package or the API playbook.

16. The non-transitory tangible computer readable storage medium of claim 10, wherein the CLI package includes a set of CLI scripts and a script identifying the correct execution order of the CLI scripts;

wherein the script identifying the correct execution order of the CLI scripts is configured to enforce a precise order of execution of the CLI scripts to control flow of the CLI scripts to mirror be a flow of the FSM of the graphical user experience design that was used to create the CLI package.

17. The non-transitory tangible computer readable storage medium of claim 10, wherein the API playbook includes a set of API files and an API file identifying the correct execution order of the API files;

wherein the API file identifying the correct execution order of the API files is configured to enforce a precise order of execution of the API files to control flow of the API files to mirror be a flow of the FSM of the graphical user experience design that was used to create the API playbook.

18. The non-transitory tangible computer readable storage medium of claim 10, wherein the logic describing the graphical aspects of the user experience design includes HTML, JavaScript, and Cascading Style Sheets (CSS), and wherein the logic describing the graphical aspects of the user experience design, and logic describing states of the user experience design and transitions between states of the user experience design includes JSON, XML, or YAML code.

* * * * *